O. B. SCHOENKY.
DRILL HOLDER.
APPLICATION FILED MAY 5, 1913.
1,117,917.
Patented Nov. 17, 1914.
2 SHEETS—SHEET 1.
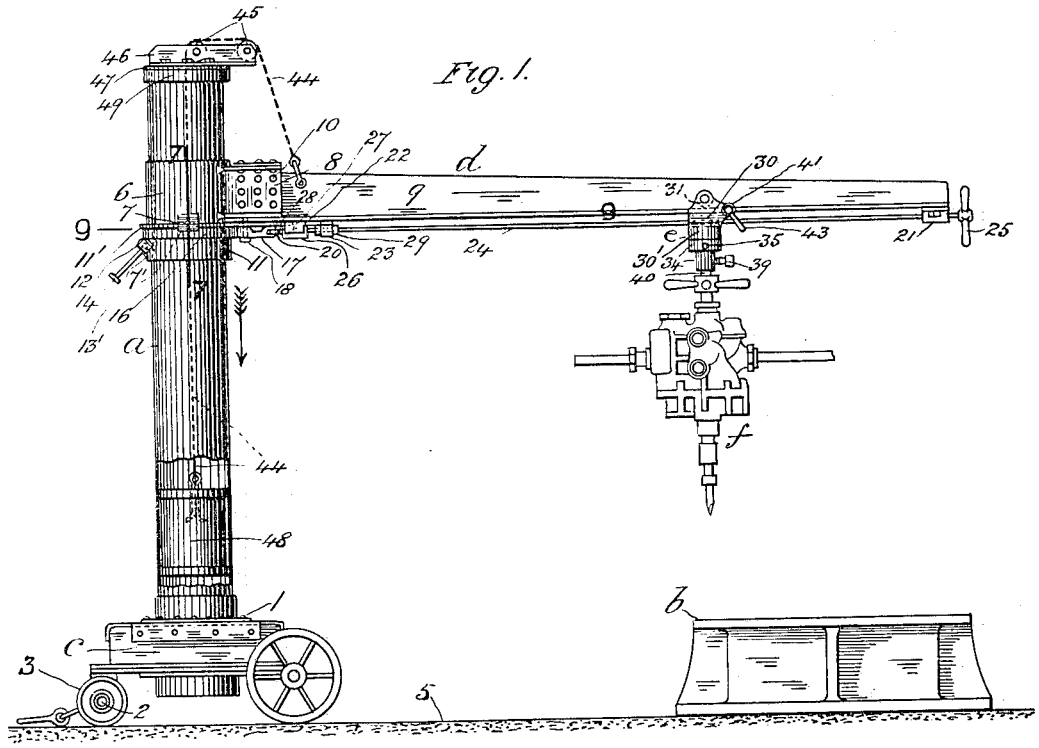
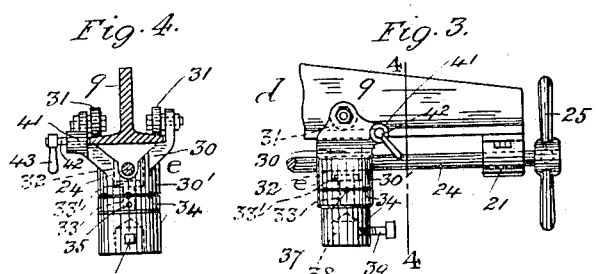
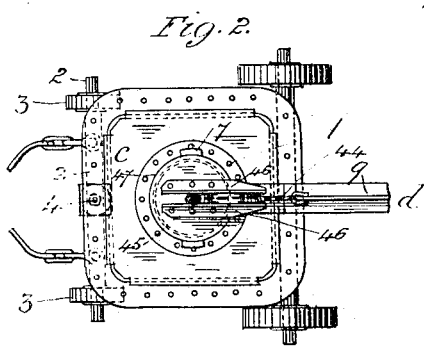
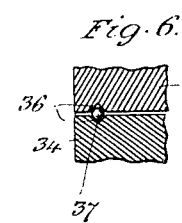
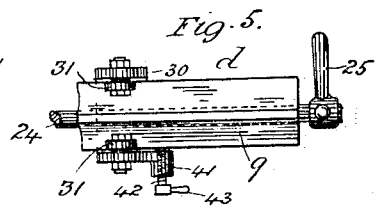
Witnesses
Inventor
Otto B. Schoenky
By Edward W. Furrell
Atty

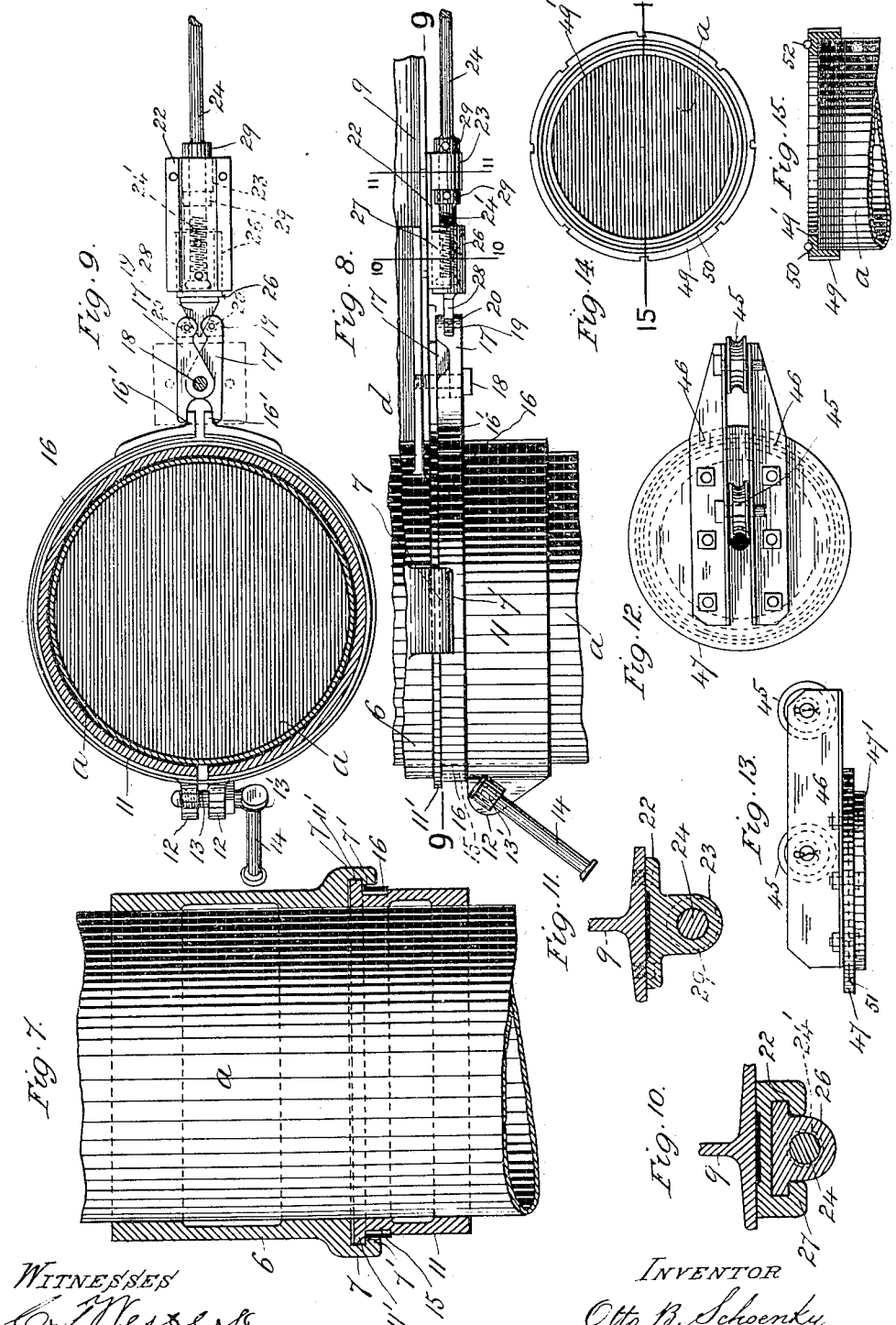

UNITED STATES PATENT OFFICE.

OTTO B. SCHOENKY, OF SACRAMENTO, CALIFORNIA.

DRILL-HOLDER.

1,117,917.      Specification of Letters Patent.      Patented Nov. 17, 1914.

Application filed May 5, 1913. Serial No. 765,581.

*To all whom it may concern:*

Be it known that I, OTTO B. SCHOENKY, a citizen of the United States, residing at Sacramento, in the county of Sacramento and State of California, have invented a new and useful Improvement in Drill-Holders, of which the following is a specification.

My invention relates to a drill holder, specially applicable to a pneumatic drill, and is in the nature of an improvement on the invention for which I have made application for Letters Patent in the United States, dated February 3, 1913, Serial Number 746,022, for an improvement in drill holders, and my invention has for its object to enable the drill to be moved from place to place in any direction according to the location of the work to be drilled, without the necessity of lifting the drill and using a tool for re-setting the same as at present, thereby saving time and labor and insuring greater accuracy of work.

It consists in features of novelty as hereinafter described and claimed, reference being had to the accompanying drawing forming part of this specification, whereon, Figure 1, is a side elevation of my improved drill holder as applied to a pneumatic drill in position preparatory to drilling a hole through a steel casting; Fig. 2, a top plan of the same broken away; Fig. 3, a side elevation to enlarged scale, of the adjustable arm (broken away) and drill carrier forming parts of my improved holder as seen in Fig. 1; Fig. 4, a vertical transverse section through the same on line 4, 4, in Fig. 3; Fig. 5, a top plan thereof; Fig. 6, a sectional detail to enlarged scale of the swivel joint between the body and lower part of the drill carrier seen in Figs. 1 and 3; Fig. 7, a vertical transverse section to enlarged scale on line 7, 7, in Fig. 1, through the pivoted end or hub of the adjustable arm and its combined locking bush about the upright post (broken away) forming parts of the holder; Fig. 8, a side elevation to enlarged scale, taken at right angles to Fig. 7, and as seen in Fig. 1, of the hub and adjacent part of the adjustable arm (broken away) with the combined bush and other parts of the locking device; Fig. 9, a horizontal section of the same on line 9, 9, in Figs. 1 and 8; Figs. 10 and 11, cross sections to enlarged scale, through the adjustable arm and locking parts on lines 10, 10, and 11, 11, respectively, in Fig. 8; Fig. 12, a top plan to enlarged scale, of the revoluble plate and counterbalance rollers on the upper end of the upright post, and forming parts of the holder, as seen in Fig. 3; Fig. 13, a side or edge view thereof; Fig. 14, a top plan of the circular ring and bearing on the upper end of the post, for the revoluble plate seen in Figs. 12 and 13, and Fig. 15 a vertical section through the same on line 15, 15, in Fig. 14.

Like letters and numerals of reference denote like parts in all the figures.

My improved drill holder consists of a preferably, circular and tabular upright post *a* which, in lieu of being immovably affixed at its lower end directly to the casting *b* to be drilled as described and shown in my aforesaid application, is in the present case preferably, flanged and secured thereat by rivets 1, or otherwise, to the bed of a preferably, four wheel truck or analogous vehicle *c* which may be of any suitable construction, such as shown, and having the axle 2 of its front guiding wheels 3 horizontally pivoted about the king-bolt 4 (Fig. 2) in the usual well-known manner, whereby the truck *c* with the upright post *a* and appendages comprising the drill holder is movable along the floor or ground 5 in any direction according to the location of the work to be drilled. Projecting from the post *a* is a horizontally arranged arm *d* which may be of any suitable length and construction, and is adapted to be vertically adjustable along, and radially about the post *a*.

The arm *d* is formed at one end with a centrally perforated circular hub or boss 6 which is fitted around and slidable along the post *a*, the hub 6 being formed circumferentially at the bottom with two (or more) opposite dependent lugs or ears 7 having their inner sides below the hub 6, diametrically larger than the latter, and having their lower ends respectively, formed with an inwardly hooked portion 7' for the purpose hereinafter specified.

From the periphery of the hub 6 project two opposite and preferably channel-shaped brackets 8 of suitable length having their upright webs parallel to and spaced apart from each other for receiving one end portion of the upright web of a horizontally arranged and preferably, inverted T-shaped bar 9 which may be of any desired length, and with the hub 6, constitutes the arm $d$ of the holder, the bottom flanges of the brackets 8 bearing on the corresponding end portions of the bottom flanges of the bar 9 and the whole fixed together by rivets 10 or otherwise as found most suitable. Below the hub 6 is a bush or sleeve 11 which is also slidable along the post $a$ and formed at its upper end with a circular flange or collar 11' which bears against the bottom edge of the hub 6 and is engaged on its underside by the hooked end portions 7' of the lugs 7 depending from the hub 6, as seen particularly in Fig. 7, whereby the bush 11 is held vertically to the hub 6 and slidable therewith along the post $a$, and the hub 6 rotatable about the post $a$ independently of the bush 11 which is normally fixed to the post $a$ as follows: The bush 11 is preferably, split or divided vertically at one part thereof, each divided part being formed thereat with an outwardly projecting bracket or lug 12, the lugs 12 facing each other vertically and perforated horizontally for receiving a bolt 13 which is screw-threaded at one end through one of the lugs 12 and formed at its other end with a head 13' having its shoulder against the outer face of the other lug 13, the head 13' being provided with a suitable handle 14 whereby, on turning the bolt 13 in one direction the divided parts of the bush 11 are closed toward each other and the latter thereby tightly clamped or fixed to the post $a$, while on turning the bolt 13 in the opposite direction, the bush 11 is released from, and free to be moved with the hub 6 of the arm $d$ along the post $a$.

The bush 11 is formed circumferentially, at or near its top flange or collar 11', with a circular recess 15 for receiving a friction band 16 which is split or divided at one part, preferably immediately beneath the bar 9, each divided part having thereat an outwardly projecting lug 16', the lugs 16' facing each other vertically and respectively, engaged on its outer face by one end of a horizontally arranged lever 17 of the first order which extends longitudinally with and beneath the bar 9 at a suitable distance therefrom, the levers 17 being pivoted about a common center pin or fulcrum 18 passing vertically therethrough and fixed to the bar 9, the other end of each lever 17 being formed with a jaw 19 in which is pivoted a horizontally revoluble roller 20, the rollers 20 being circumferentially opposite to each other in the same plane at a minimum distance apart when the lugs 16' of the friction band 16 are separated from each other and the friction band 16 released from contact with the bottom surface of the recess 15 in the bush 11 as seen in Fig. 9.

To the underside of the bar 9 at its outer free end is fixed a bearing 21, and to the underside of the bar 9 adjacent to the levers 17, is fixed a bracket 22 having a dependent bearing 23 at its outer end, the bearings 21 and 23 being perforated longitudinally and parallel to the underside of the bar 9, and in alinement with each other for the passage therethrough of a circular rod or shaft 24 having a handle 25 at its outer end beyond the bearing 21, and having an enlarged screw-threaded portion 24' where it passes through and engages with the correspondingly threaded perforation in a block 26 which is slidable longitudinally in a guide 27 dependent from the bracket 22 at its inner end, the block 26 beyond the latter having a horizontally arranged triangular-shaped projecting tang 28, the outer end or apex of which is extended between and in initial engagement with the rollers 20 of the levers 17 when the parts are in the position seen in Fig. 9 as aforesaid. On the shaft 24 is fixed, so as to bear against each end face of its bearing 23, a collar 29, whereby the shaft 24 is prevented from longitudinal movement at all times.

The carrier $e$ for the pneumatic drill $f$ which is of the usual well-known construction, consists preferably, in the present case and as described in my aforesaid application, of two parts viz:—an upper part adapted to be supported by, and to travel along the arm $d$, and a lower part swiveled to the upper part and engaged by the drill $f$ as hereinafter more particularly described. The upper part 30 of the carrier $e$ is preferably bifurcated and adapted to straddle the base of the bar 9. To the inner face of each branch of the bifurcated portion is pivoted a roller 31 which is adapted circumferentially to bear on and travel along the corresponding bottom flange of the bar 9, the part 30 at the junction of its bifurcation beneath the bar 9 being formed with a central vertically dependent circular shank 30' having a central pocket 32 in, and for a suitable depth from its upper face, and thence formed with a central vertical perforation through the bottom end of the shank 30' for receiving a circular bolt 33 having a head 33' which bears on the bottom of the pocket 32, the bolt 33 projecting below the shank 30' and engaging in a pocket formed therefor in, and for a suitable depth from the upper end face of the lower, and preferably, circular part 34 of the carrier $e$, the bolt 33 being fixed to the part 34 by a pin 35, or in any other suitable manner.

In the meeting faces, or thereabout, respectively, of the parts 30 and 34 is formed a preferably square-shaped (or circular) groove 36 which is concentric with the bolt 33, the grooves 36 registering with each other for receiving a series of balls 37.

whereby the lower part 34 of the carrier e is swiveled to and carried by the upper part 30, and rotatable at all times independently thereof.

In the bottom end face, and for a suitable depth therefrom, of the lower part 34 is formed a vertical circular socket 38 in which is centered, and removably fixed by a set screw 39, the pivotal shaft 40 of the drill f which is thereby dependently held by the carrier e ready for use at all times in whatever position the latter is moved.

For holding the carrier e to the bar 9 at any point of its travel along the same, one of the branches of the bifurcation of the upper part 30 is formed with an ear or lug 41 through which is threaded a set screw 42 having a suitable handle 43 within reach of the operator, whereby the free end of the screw 42 can be engaged with the edge of the bar 9. Or any other suitable means may be used for this purpose.

It will be noted that the upper end of the shank 30' of the part 30 beneath the bar 9 and above the head of the bolt 33 is so shaped as to be clear of the rod or shaft 24 at all times during the travel of the carrier e to and fro along the bar 9.

For counterbalancing the weight of the arm d and relieving the undue strain caused by its leverage about the post a, I preferably, couple one end of a chain 44 to the bar 9 at a suitable distance from the post a and thence direct the chain 44 over pulleys 45 which are pivoted to, and vertically revoluble between, two opposite brackets 46 fixed on a circular plate 47 which covers the upper end of the post a and is perforated centrally for the passage therethrough of the chain 44 to the other end of which, within the post a, is attached a counterbalance weight 48.

Around the upper end of the post a is fixed a ring 49 having an inner circular flange 49' at the top which overlaps the edge of the post a thereat, and on the underside of the cover plate 47 is a circular dependent flange or beading 47' which in the assembled position of the plate 47 fits within the opening of the flange 49' and holds the plate 47 in position.

In the upper face of the flange 49' is a circular groove 50 which is concentric with the post a and registers with a similar groove 51 in the underside of the cover plate 47 for receiving a series of balls 52 (see Fig. 15) whereby, when radially adjusting the arm d about the post a as hereinafter referred to, the cover plate 47 with the pulleys 45, is enabled to be freely rotated in either direction as constrained by the arm d and chain 44.

In operation, assuming the parts of the drill holder to be in their relative positions as seen in Figs. 1, 7, 8, and 9, that is to say, with the bush 11 and hub 6 of the arm d released from, and free to slide vertically along the post a, and the friction band 16 released from the bush 11, and the arm d with the carrier e and drill f in the position shown above the casting to be drilled; on lowering the said parts in the direction of the arrow seen in Fig. 1, until the point of the drill f is in contact with the casting b, and then turning the bolt 13 in the required direction, the bush 11 will be clamped or fixed to the post a and with the hub 6 thereby held at the required level, when, by rotating the shaft 24 by its handle 25 to the right in its bearings 21 and 23, the left-handed screw-threaded portion 24' of the shaft 24 will force the block 26 toward the post a, or so that its tang 28 in engagement with the rollers 20 will advance and separate the outer arms and close the inner arms of the levers 17 about their pivot 18, thereby closing the lugs 16' and clamping the friction band 16 to the bush 11 for locking the arm d thereto against radial movement around the post a in which position of the parts the drill f is ready for operation, it being here noted that, whatever position the said parts may assume when being adjusted relatively to the post a, they are at all times practically counterbalanced by the weight 48.

On finishing the hole through the casting b, and it being desired to move the drill into another position, by rotating the shaft 24 in the opposite direction, the tag 28 is withdrawn from engagement with the levers 17 and the friction band 16 thereby released from the bush 11 so that the arm d may be radially moved about the post a, and in so doing, the cover plate 47 of the post a and the counterbalance weight 48, being constrained by the chain 44, revolve freely with the arm d. Again if desired, by turning the bolt 13 in the opposite direction the bush 11 is released from, and with the arm d thereby free to be raised along, the post a for vertical readjustment; also, by disengaging the set screw 42 from the bar 9, the drill carrier e can be moved in either direction for readjustment along the bar 9. Furthermore, by mounting the post a and other appendages of the drill holder on the truck or rolling support c the entire apparatus can be readily moved from place to place in any direction and readjusted according to the location of the work to be drilled without having to lift and readjust the drill directly by hand and the use of tools as at present, whereby a considerable saving of time and labor is effected.

What I claim as my invention and desire to secure by Letters Patent is:—

A drill holder, consisting of an upright member, a rollable support for the said member, an arm rotatable about and slidable along the said member at right angles thereto, a sleeve slidable with the arm along the said member, means for adjustably fixing the sleeve to the said member, a friction band encircling the said sleeve, two opposite levers of the first kind spaced apart at their ends and having a common fulcrum fixed to the arm, the said levers being adapted at one end to engage the divided ends of the said band, a wedge adapted to diverge the other ends of the said levers, and means for moving the said wedge into and out of engagement with the said levers.

OTTO B. SCHOENKY.

Witnesses:
H. W. GARDINER,
J. ROSS.